United States Patent [19]
Trzmiel

[11] Patent Number: 5,887,851
[45] Date of Patent: Mar. 30, 1999

[54] CONTROL DEVICE, ESPECIALLY FOR A TRANSMISSION OF A MOTOR VEHICLE, AS WELL AS A METHOD FOR MANUFACTURING SUCH A CONTROL DEVICE

[75] Inventor: Alfred Trzmiel, Grafenberg, Germany

[73] Assignee: Hydraulik-Ring Antriebs- und Steuerungstechnik GmbH, Nürtingen, Germany

[21] Appl. No.: 695,365

[22] Filed: Aug. 9, 1996

[30] Foreign Application Priority Data

Aug. 11, 1995 [DE] Germany .......................... 195 29 550.1

[51] Int. Cl.$^6$ .................................................. H01F 41/02
[52] U.S. Cl. .................. 251/129.15; 29/605; 264/272.19
[58] Field of Search .................................. 29/602.1, 605; 251/129.01, 129.15; 264/272.19; 303/119.2

[56] References Cited

U.S. PATENT DOCUMENTS

| | | | |
|---|---|---|---|
| 5,226,221 | 7/1993 | Kilgore | 29/605 |
| 5,331,730 | 7/1994 | Brinn, Jr. | 264/272.19 X |
| 5,423,117 | 6/1995 | Okada et al. | 29/605 |
| 5,533,249 | 7/1996 | Wakeman | 29/605 |

*Primary Examiner*—Kevin Lee
*Attorney, Agent, or Firm*—Robert W. Becker & Associates

[57] ABSTRACT

A control device has an electronic control unit and at least one proportional solenoid valve with a solenoid and a valve body. A plastic matrix is provided in which the valve body is at least partly embedded for securing the solenoid at the valve body. The control device is manufactured by introducing the electronic control unit and at least one solenoid into the first half of an injection mold. The at least one valve body is introduced into the second half of the injection mold. The first and second halves of the injection mold are then advanced toward one another such that the solenoid and the valve body are assembled to a proportional valve. A plastic material is then injected into the injection mold to form the plastic matrix for securing the solenoid at the valve body.

6 Claims, 5 Drawing Sheets

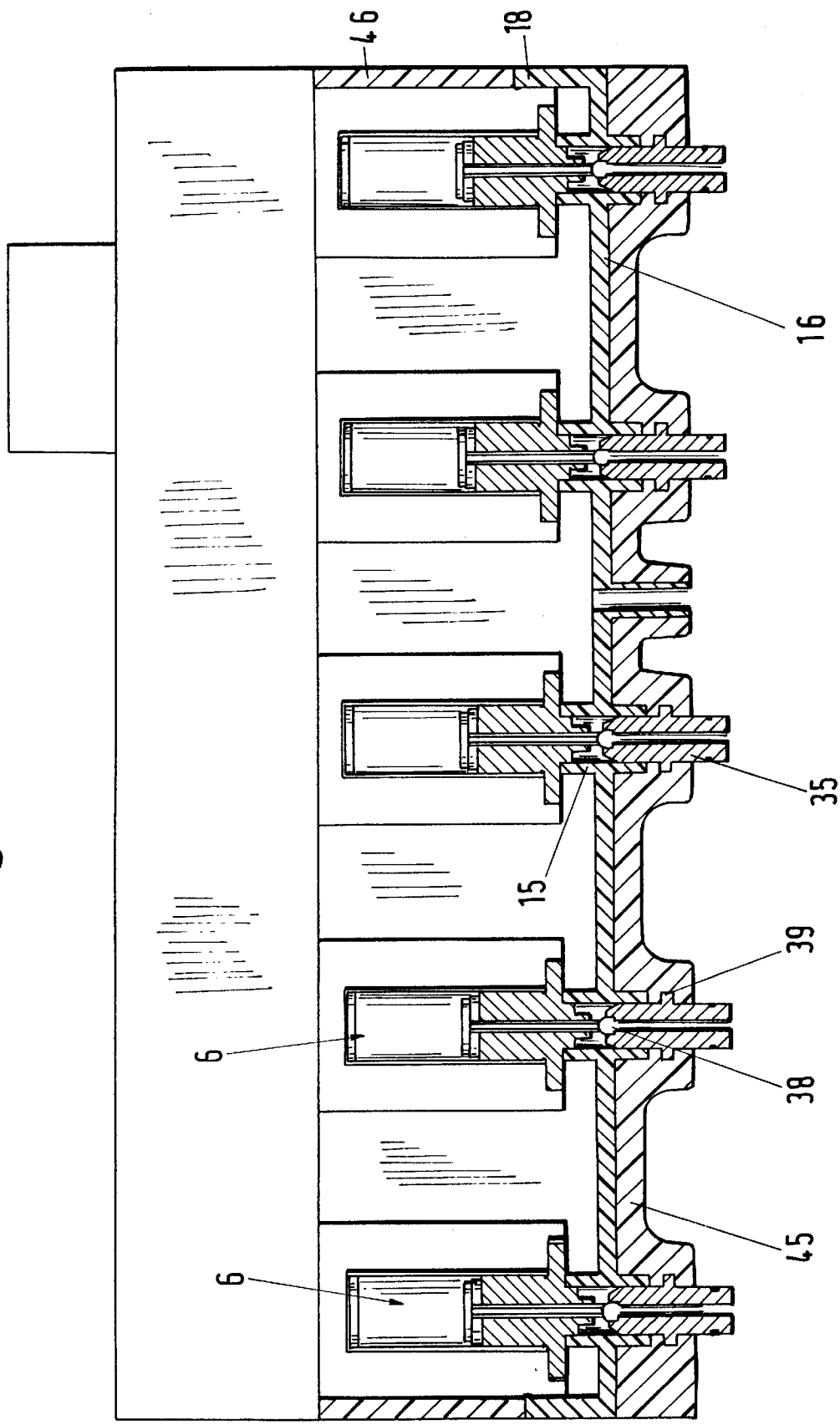

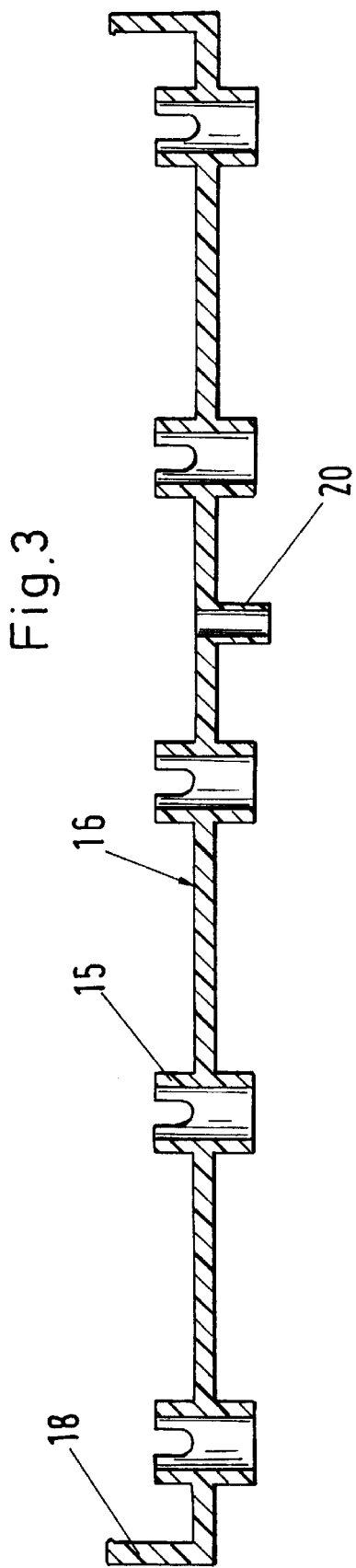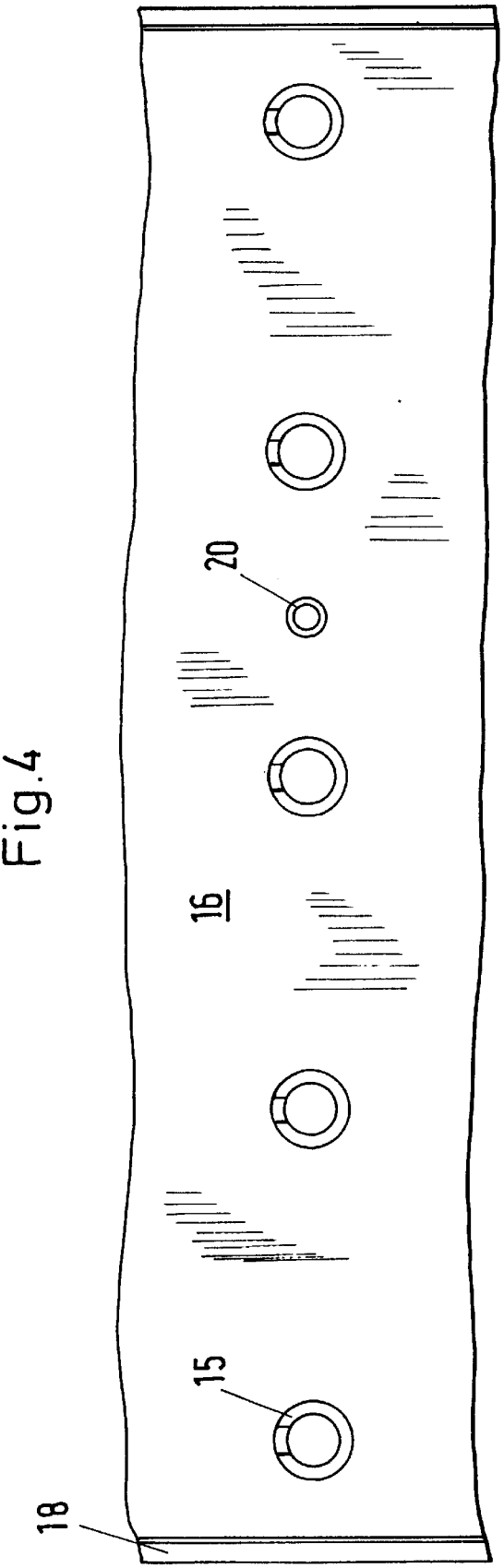

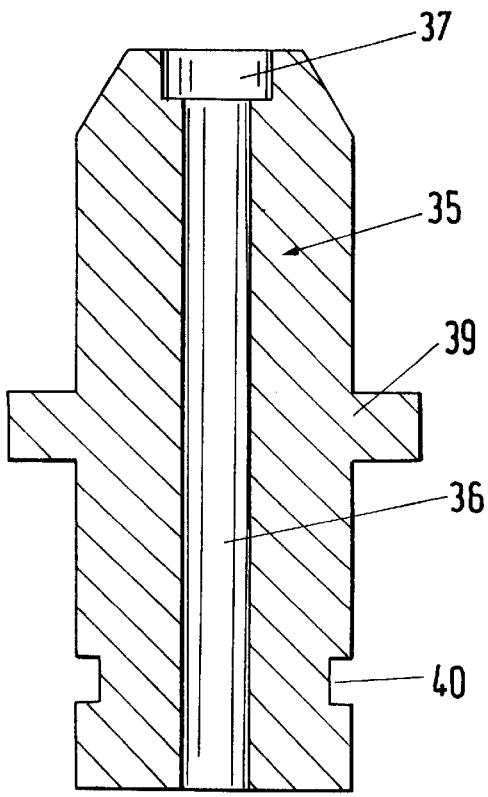
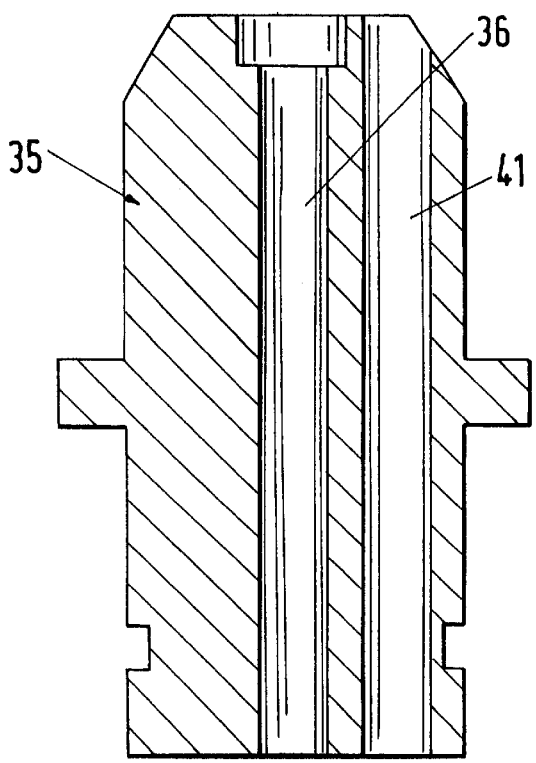
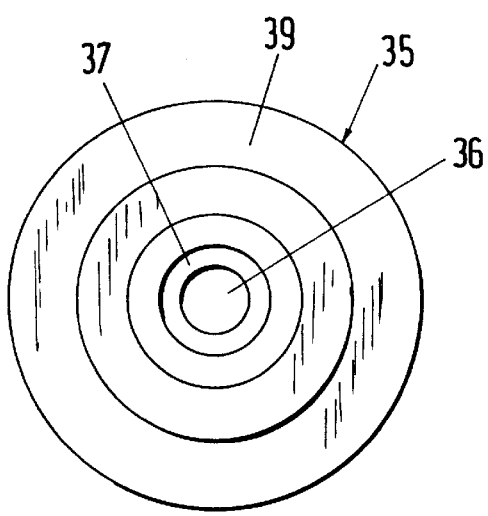
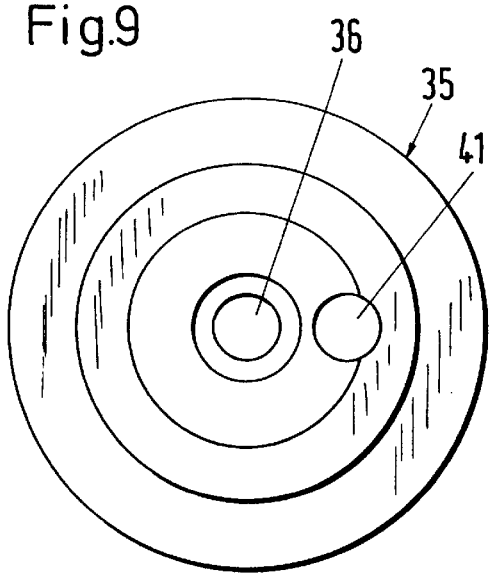

5,887,851

CONTROL DEVICE, ESPECIALLY FOR A TRANSMISSION OF A MOTOR VEHICLE, AS WELL AS A METHOD FOR MANUFACTURING SUCH A CONTROL DEVICE

BACKGROUND OF THE INVENTION

The present invention relates to a control device, especially for a transmission of a motor vehicle, comprising an electronic control unit which has connected thereto at least one proportional solenoid valve comprised of a solenoid and a valve body. The present invention also relates to a method for manufacturing such a control device with the aforementioned features.

Such control devices are used in connection with automatic transmissions of motor vehicles and have proportional valves for improving the driving comfort. These proportional valves are mounted as individual components or are introduced as a combined hydraulic block. The proportional solenoid valves however must realize a very precise reproducible characteristic line so that the manufacture of such control devices is complicated and expensive.

It is therefore an object of the present invention to embody a control device of the aforementioned kind as well as a manufacturing method for it such that a simple, inexpensive manufacture is possible.

SUMMARY OF THE INVENTION

The inventive control device is primarily characterized by:

An electronic control unit;

At least one proportional solenoid valve comprising a solenoid and a valve body;

A plastic matrix in which the valve body is at least partly embedded for securing the solenoid at the valve body.

Advantageously, the control device further comprises at least one sealing element positioned between the solenoid and the valve body.

Advantageously, the sealing element is a sealing plate.

The plastic matrix is preferably fixedly connected with the sealing element.

Advantageously, the plastic matrix is connected to a side of the sealing element facing the valve body.

The sealing element has a first and a second areal face facing in opposite directions and comprises at least one plug-in part projecting from both of the opposite areal faces. Preferably, the plug-in part is a sleeve.

The solenoid is positioned in the sleeve at the first areal face and the valve body is positioned in the sleeve at the second areal face.

The at least one plug-in part is at least partly embedded in the plastic matrix.

The valve body has at least one anchoring member embedded in the plastic matrix.

The anchoring member is preferably a radially projecting flange.

The present invention also relates to a method for manufacturing a control device comprising an electronic control unit, at least one proportional solenoid valve comprising a solenoid and a valve body, and a plastic matrix in which the valve body is at least partly embedded for securing the solenoid at the valve body. According to the present invention the method is primarily characterized by the following steps:

Introducing the electronic control unit and at least one solenoid into a first half of an injection mold;

Introducing at least one valve body into the second half of the injection mold;

Advancing the first and second halves of the injection mold toward one another such that the solenoid and the valve body are assembled to a proportional valve;

Injecting a plastic material into the injection mold to form the plastic matrix for securing the solenoid at the valve body.

Advantageously, the method further comprises, the step of supplying a voltage to the solenoid before injecting the plastic material.

Advantageously, the method further comprises before injecting the plastic material, the step of pressure-loading the proportional valve relative to the solenoid supplied with voltage such that the proportional valve has a predetermined characteristic point.

Preferably, the method further comprises the step of placing onto the solenoid at least one sealing element.

The sealing element is preferably a sealing plate.

Advantageously, the method further comprises the step of slipping the sealing element onto the valve body during the step of advancing the first and second halves of the injection mold toward one another.

With the inventive control device the valve body of the proportional solenoid valve is at least partially embedded in the plastic matrix with which the solenoid and the valve body of the proportional solenoid valve are held together. The system embedded within the plastic matrix thus provides an integrated hydraulic control system for transmissions such as automatic transmissions or manual transmissions. The control device can be manufactured inexpensively especially since no cables or connectors are required between the electronic control unit and the hydraulic part. The solenoid and the valve body of the proportional solenoid valve are introduced into the two halves of an injection mold. By advancing the two halves of the injection mold, the solenoid and the valve body of the proportional solenoid valve are assembled. Subsequently, the plastic material is injected into the injection mold which thus fixedly connects the two parts of the proportional solenoid valve.

BRIEF DESCRIPTION OF THE DRAWINGS

The object and advantages of the present invention will appear more clearly from the following specification in conjunction with the accompanying drawings, in which:

FIG. 2 shows a representation corresponding to FIG. 1 of the injection mold after introduction of the plastic material;

FIG. 3 shows a longitudinal section of a sealing plate of the inventive control device;

FIG. 4 shows a plan view of a part of the sealing plate of FIG. 3;

FIG. 6 shows in an enlarged representation and in axial section a valve body of the inventive control device;

FIG. 7 shows a plan view of the valve body of FIG. 6; and

FIGS. 8 and 9 show in representations corresponding to those of FIGS. 6 and 7 a second embodiment of a valve body.

DESCRIPTION OF PREFERRED EMBODIMENTS

The present invention will now be described in detail with the aid of several specific embodiments utilizing FIGS. 1 through 9.

Figure 1:
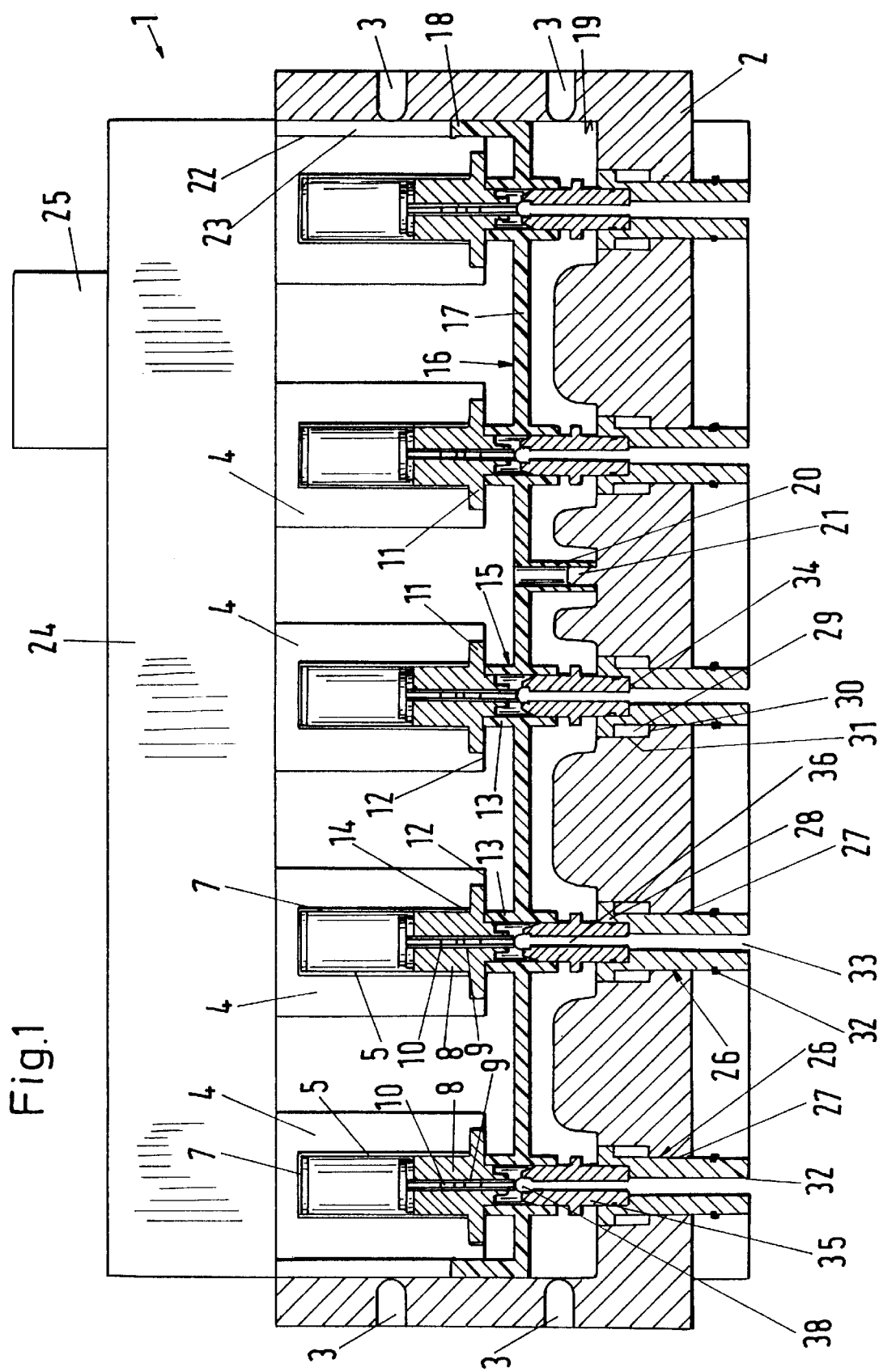
FIG. 1 is a cross-section of an injection mold in which the parts of the inventive control device for an automatic transmission of a motor vehicle are inserted.

FIG. 1 shows in cross-section an injection mold with an upper half 1 and a lower half 2. The lower half 2 has injection openings 3 through which the plastic material during injection is introduced in a manner known per se. The upper half 1 has a receiving member for magnetic parts 5 (armature) of proportional solenoid valves 6 (FIG. 2) and an electronic control unit 24. The magnetic parts 5 have respectively a connecting body 7 which is sleeve-shaped and closed at the top. In the injection position according to FIG. 1 a guide body 8 extends from below into the connecting body 7 which has a central axial bore 9 in which a plunger 10 is axially displacably secured. This plunger 10 in the shown embodiment has a hexagonal shape but, of course, can have any other suitable cross-sectional shape.

The guide body 8 rests with a radial flange 11 on the bottom 12 of receiving chamber 4 of the control device.

A through opening 13 opens into the bottom 12 of the receiving chamber 4 into which the guide body 8 with a projection 14 extending past the flange 11 extends. In each through opening 13 one sleeve part 15 of a sealing plate 16 is positioned. The sealing plate 16 has a plate-shaped base body 17 with sleeve parts 15 extending from both faces upwardly, respectively, downwardly so as to have the same length. With the portion projecting in the upward direction past the base body 17 (FIG. 1) the sleeve part 15 rests with its circumference at the inner wall of the through opening 13. The projection 14 of the guide body 8 extends in the position according to FIG. 1 from the top into the upper part of the sleeve part 15 and rests circumferentially at its inner wall.

The sealing plate 16 has a circumferential edge 18 with which the sealing plate sealingly rests at the inner wall 19 of the lower half 2 of the injection mold.

The sealing plate 16 has downwardly projecting sleeve-shaped spacers 20 with which it is placed onto projections 21 of the lower half 2 of the injection mold.

In this manner the sealing plate 16 is securely spaced at a distance to the lower half 2.

The circumferential edge 18 of the sealing plate 16 is perpendicularly arranged in the upward direction and rests at the outer wall 22 of the housing of the control unit. In this manner, between the injection mold half 2 and the housing of the control unit a peripheral hollow space 23 is provided the thickness of which corresponds to the thickness of the edge 18.

The connecting bodies 7 contain the non-represented drive coils which are connected with the electronic control unit 24 which is contained in a respective housing having an interface 25.

The injection mold half 2 comprises a number of receiving holders 26 corresponding to the number of the guide bodies 8, respectively, sleeve parts 15. They are in the form of sleeves which are supported in the openings 27 of the injection mold half 2. The receiving holders 26 at the end facing the upper half 1 of the injection mold are provided with circumferential flanges 28 which support one end of a coil pressure spring 29. The other end of the coil spring 29 rests at the bottom 30 of an area 31 of the opening 26 which has a widened diameter. With the coil pressure spring 29 the respective receiving holder 26 is loaded in the direction of the upper half 1 of the injection mold. The receiving holders 26 in the area below the lower half 2 are provided with a spring ring 32 which is inserted into a circumferential groove of the receiving holder 26 and which serves as an abutment. Under the force of the respective coil pressure spring 29 the respective receiving holder 26 can be displaced in the upward direction within the opening 27 only to such an extent until the spring ring 32 rests at the underside of the lower half 2 of the injection mold.

The receiving holder 26 is provided with a central axial bore 33 into which an end face depression 34 opens. The depression 34 has a greater diameter than the bore 33 and receives the lower end of a valve body 35 introduced therein.

The valve body 35 has, as is shown in FIGS. 6 and 7, a central axial bore 36 which is aligned during the injection molding process, to be described in the following, with the bore 33 of the receiving holder 26. In the represented embodiment (FIG. 1) the bore 33 of the receiving holder 26 has a greater diameter than the bore 36 of the valve body 35. The bore 36 opens with its end facing the guide body 8 into a depression 37 (FIG. 6) having a greater diameter than the bore 36. The depression 37 receives a valve ball 38 (FIG. 1) at which in the mounted state the plunger 10 rests in a manner known per se.

The valve body 35 is provided at half its length with a radially outwardly oriented circumferential flange 39 which serves as an anchoring means in order to secure the valve body 35 safely within the plastic material. In the vicinity of the end facing away from the depression 37 the valve body 35 is provided with a circumferential annular groove 40 in its mantle surface in which a sealing ring is inserted. The valve body 35 has a circular crosssection and is conically tapered at the end provided with the depression 37. Accordingly, the sealing plate 16 during the injection molding process to be described in the following can be easily placed with the sleeve parts onto the valve body 35 seated within the receiving holders 26. The circumferential flange 39 of the valve body 35 rests, as shown in FIG. 1, within the injection mold at a distance below the respective sleeve part 15 of the sealing plate 16.

As is shown in FIGS. 8 and 9, the valve body 35 can also be provided with a further parallel-extending bore 41 in addition to the central bore 36. Otherwise, the valve body according to FIGS. 8 and 9 corresponds substantially to the embodiment according to FIGS. 6 and 7.

Figure 5:
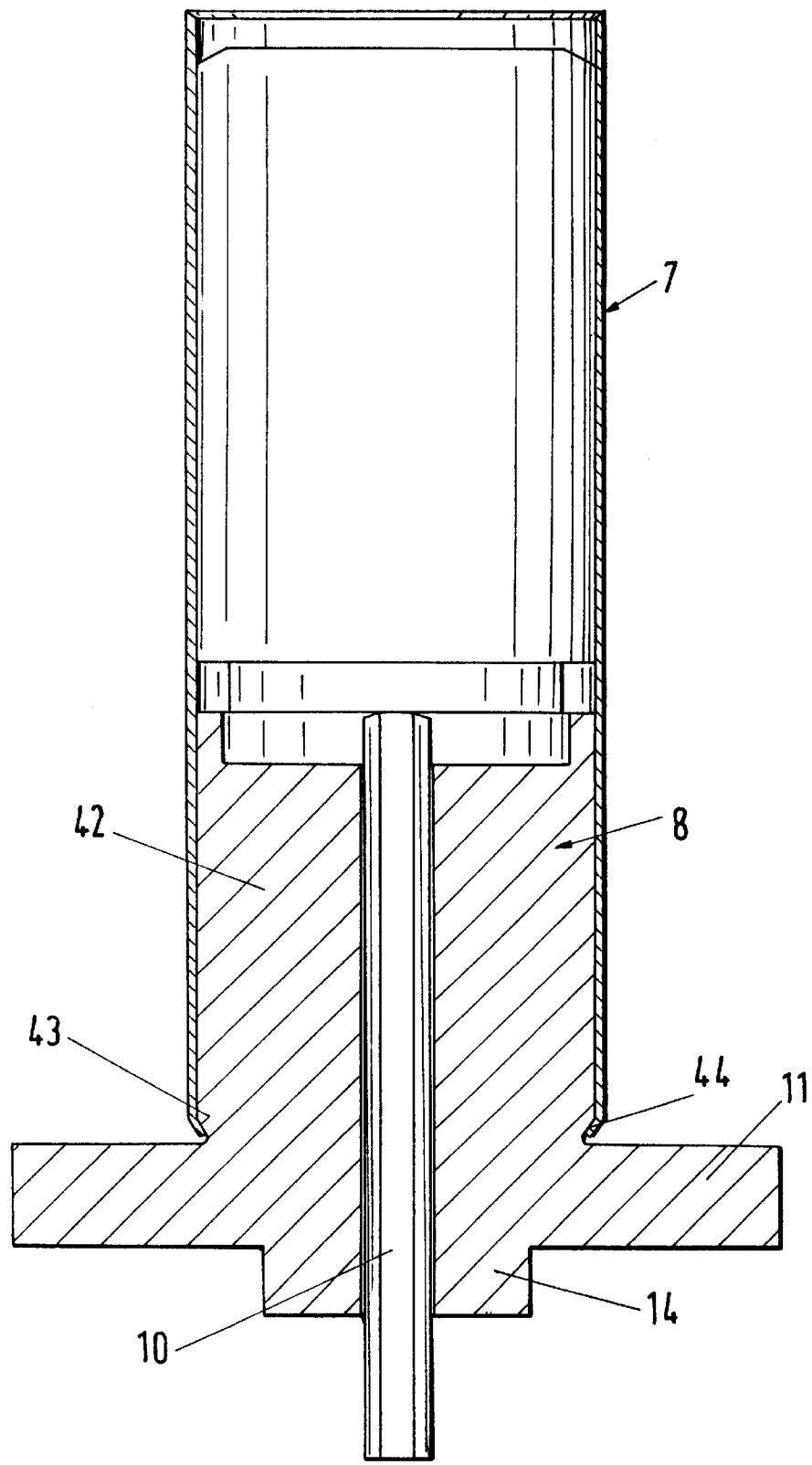
FIG. 5 shows in axial section and in a detailed representation a solenoid of a proportional solenoid valve of the inventive control device.

The guide body 8 has in the vicinity of its end facing the valve body 35 a circumferential radially extending flange 11 (FIG. 5). The projection 14 which is provided at the side of the flange 11 facing the valve body 35 has a smaller diameter than the base body 42 at the opposite side of the flange 11. At the transition of the base body 42 into the flange 11 a circumferential constriction 43 is provided which is engaged by the angled edge 44 at the lower end of the connecting body 7. This ensures a reliable axial connection which prevents that the connecting body 7 can be pulled off the guide body 8. The connecting body 7 is preferably comprised of plastic material, but may also be comprised of any other suitable material. In the connecting body 7 drive spools (non-represented) are provided which by supplying current thereto displace the non-represented armature so that the plunger 10 is axially displaced. Since such an embodiment is well known in the art, there will be no further explanation in regard to it.

In the injection mold the control unit 24 is encapsulated together with the proportional solenoid valve 6 to form a unit. First, the guide bodies 8 are inserted into the connecting bodies 7 which, in turn, are placed onto the upwardly projection parts of the sleeve parts 15 of the sealing plate 16. The guide bodies 8 rest with their flanges on the sleeve parts 15 (FIG. 1). The sealing plate 16 with its sleeve parts 15 prevents a displacement of the guide bodies and connecting bodies 7. Subsequently, the plungers 10 are introduced into the guide bodies 8. The parts are positioned within the injection mold half 1.

The receiving holders 26 within the injection mold half 2 are moved in the upward direction with the force of the coil pressure spring 29 until they abut the spring rings 32 at the bottom side of the injection mold half 2. The valve bodies 35 are introduced into the depressions 34 of the receiving holders 26. The valve balls 38 are placed into the depressions 37 at the end faces of the valve bodies 35 and are maintained in their position by vacuum acting via the bores 33 and 36.

Subsequently, the injection mold half 1 is displaced in the downward direction whereby the sleeve parts 15 of the sealing plate 16 are slipped onto the valve bodies 35. Due to the conical tapering of the valve body 35, the sealing plate 16 with sleeve parts 15 can be placed effortlessly onto the valve bodies 35 during lowering of the injection mold half 1. During this step, the valve bodies 35 and thus also the receiving holders 26 are displaced by the plunger 10 counter to the force of the coil pressure spring 29 to such an extent in the downward direction until the receiving holders 26, respectively, the valve bodies 35 have the required position. This initial position of the parts to be connected to one another in the injection mold is represented in FIG. 1. Now the integrated coils are supplied with current whereby the non-represented armatures, which are provided within the guide bodies 8 in a manner known per se, are moved in the direction toward valve body 35. Thus, the plunger 10 is moved against the valve ball 38. In this manner, the entire system is reliably radially aligned. The entire system, comprised of connecting bodies 7, guide body 8, plunger 10, sealing plate 16, and valve body 35 is now displaced by a controlled pressure counter to the solenoid which is supplied with current to such an extent that the desired characteristic point (opening current/closure current) of the proportional solenoid valve 6 and thus an exact positioning of the system solenoid/valve seat is adjusted. This characteristic line adjustment is possible because the valve body 35 is subjected to the force of the coil spring 29 and the force resulting from the controlled pressure. The valve body 35 can thus be displaced by action of the spring force as well as counter to the spring force within the injection mold to the desired degree. In this manner, the individual proportional solenoid valves are precisely positioned within the injection mold before performing the injection molding process and the desired characteristic line, respectively, the desired characteristic point is set.

Directly thereafter, the plastic material 45 (FIG. 2) is injected into the injection openings 3. The sealing plate 16 forms the upper closure of the plastic material 45 into which the valve body 35 is partly embedded. The sealing plate 16 fills the inner cross-sectional area of the lower half 2 of the injection mold and serves during the injection process as a seal relative to the magnetic movable parts 8, 9, 10. The flanges 39 of the valve body 35 form anchoring means which provide for a secure fixation of the valve body within the plastic matrix 45. The downwardly extending parts of the sleeve parts 15 projecting from the sealing plate 16 are also embedded in the plastic matrix 45 so that the sealing plate 16 is also reliably connected within the plastic matrix 45. The hollow chamber 23 (FIG. 1) is also filled with plastic material 45. This part 46 provides an intimate connection with the upwardly projecting edge 18 of the sealing plate 16. Furthermore, it provides for a connection to the upper part of the integrated control unit so that the solenoid and the hydraulic part of the proportional solenoid valve 6 are fixedly connected to one another.

The system embedded or encapsulated with the plastic matrix 45, 46 represents an integrated hydraulic control system for transmissions. The control system is suitable for automatic transmissions, for manual transmissions, for ABS, for CVT etc. The special advantage of such an integrated hydraulic control system is the elimination of all manufacturing tolerances. With the disclosed supply of current or the mechanical loading via a controlled force before the injection process, the opening point/closing point of the respective proportional control valve is exactly set. In this manner the control system can be produced inexpensively. A double contacting, i.e., cables and connectors between electronic and hydraulic systems are not required. Since the system in the manner disclosed is supplied with current before the injection molding process and is brought into the desired position of the respective opening point with counter pressure, an additional examination of the entire system with respect to function, tightness of the valve seats, valve characteristic line etc. is not necessary.

The disclosed transmission control with the integrated construction is possible with one valve per gear. Since parts of the proportional solenoid valve 6 are exactly adjusted before the injection molding process, it is ensured that within the integrated system the proportional solenoid valve 6 has a very precise reproducible pressure characteristic line.

The present invention is, of course, in no way restricted to the specific disclosure of the specification and drawings, but also encompasses any modifications within the scope of the appended claims.

What I claim is:

1. A method for manufacturing a control device comprising an electronic control unit, at least one proportional solenoid valve comprising a solenoid and a valve body, and a plastic matrix in which said valve body is at least partly embedded for securing said solenoid at said valve body; said method comprising the steps of:

introducing the electronic control unit and at least one solenoid into a first half of an injection mold;

introducing at least-one valve body into the second half of the injection mold;

advancing the first and second halves of the injection mold toward one another such that the solenoid and the valve body are assembled to form a proportional valve;

injecting a plastic material into the injection mold to form the plastic matrix for securing the solenoid at the valve body.

2. A method according to claim 1, further comprising the step of supplying a voltage to the solenoid before injecting the plastic material.

3. A method according to claim 2, further comprising, before injecting the plastic material, the step of pressure-loading the proportional valve relative to the solenoid supplied with voltage such that the proportional valve has a predetermined characteristic point.

4. A method according to claim 1, further comprising the step of placing onto the solenoid at least one sealing element.

5. A method according to claim 4, wherein the sealing element is a sealing plate.

6. A method according to claim 4, further comprising the step of slipping the sealing element onto the valve body during the step of advancing the first and second halves of the injection mold toward one another.

* * * * *